(12) United States Patent
Gardner

(10) Patent No.: US 10,050,511 B2
(45) Date of Patent: Aug. 14, 2018

(54) MAGNETIC DRIVE SYSTEM AND METHOD

(71) Applicant: James Joseph Gardner, Lancaster, OH (US)

(72) Inventor: James Joseph Gardner, Lancaster, OH (US)

( * ) Notice: Subject to any disclaimer, the term of this patent is extended or adjusted under 35 U.S.C. 154(b) by 789 days.

(21) Appl. No.: 14/276,617

(22) Filed: May 13, 2014

(65) Prior Publication Data

US 2014/0333166 A1 Nov. 13, 2014

Related U.S. Application Data

(60) Provisional application No. 61/822,714, filed on May 13, 2013.

(51) Int. Cl.
| | |
|---|---|
| *H02K 49/00* | (2006.01) |
| *H02K 33/00* | (2006.01) |
| *H02K 37/00* | (2006.01) |
| *H02K 49/02* | (2006.01) |
| *H02N 2/00* | (2006.01) |
| *H02K 49/10* | (2006.01) |
| *H02K 7/06* | (2006.01) |

(52) U.S. Cl.
CPC ............ *H02K 49/104* (2013.01); *H02K 7/06* (2013.01)

(58) Field of Classification Search
CPC ................................. H02K 49/10; H02K 7/06
USPC ........................ 310/36, 46, 103, 105, 323.02
See application file for complete search history.

(56) References Cited

FOREIGN PATENT DOCUMENTS

| DE | 2435316 A1 * | 2/1976 | ............. H02K 49/10 |
|---|---|---|---|
| RU | 2247883 C1 * | 3/2005 | |

* cited by examiner

*Primary Examiner* — Jose Gonzalez Quinone
(74) *Attorney, Agent, or Firm* — Donn K. Harms

(57) ABSTRACT

A magnetic coupling device for communicating continuous rotational or linear motion through a magnetic coupling of magnetic forces communicated from magnets operatively positioned on an oscillation assembly and a rotation assembly in positions sufficiently proximate to form the magnetic coupling. Employed to communicate an output force in a rotational direction from an input linear force communicated from a powered oscillation assembly, the magnetic force of the magnet communicating the force compresses the volume of ellipsoidal-like magnetic fields of the coupling alternately in unlike polar domains, to induce a smooth, blended polar continuity and communicate a continuous 360 degree rotational force to a rotation assembly operatively engaged with the magnetic coupling. The input force may be reversed to induce a continuous linear motion of a reciprocating assembly.

13 Claims, 9 Drawing Sheets

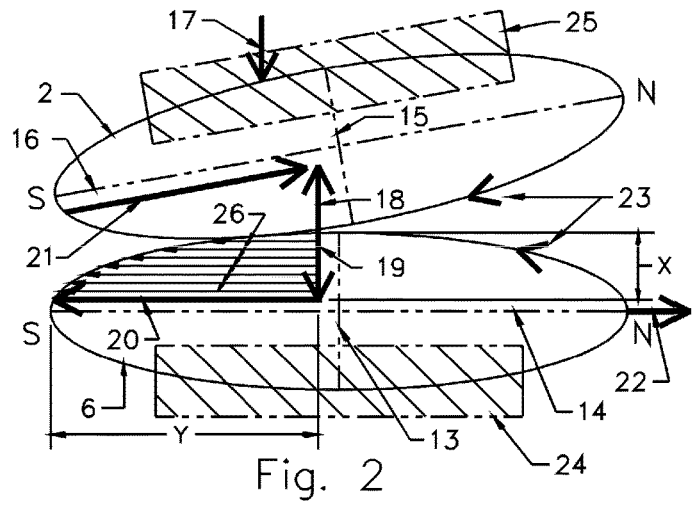
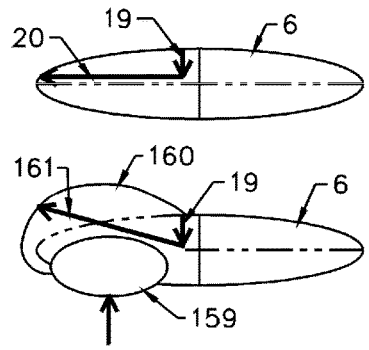
Fig. 2
Fig. 3
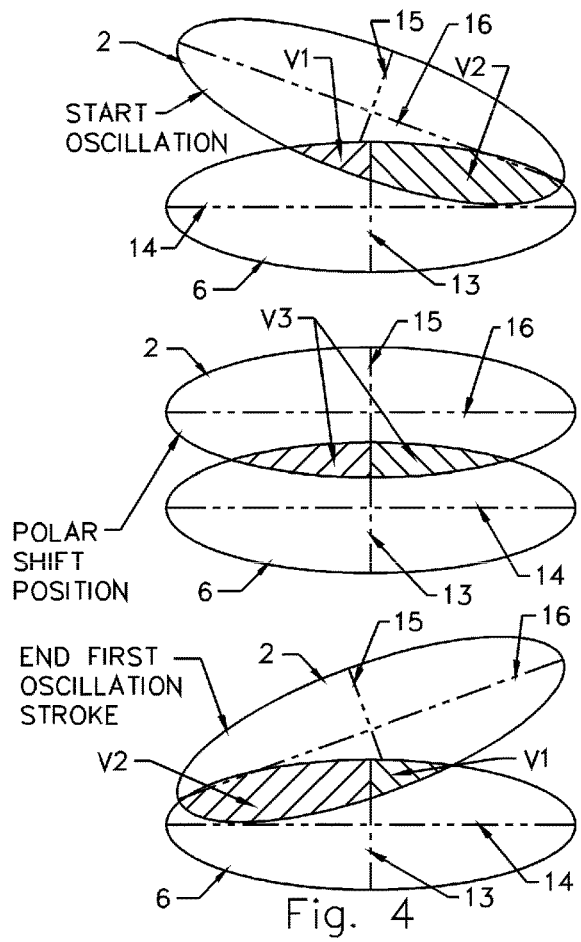
Fig. 4

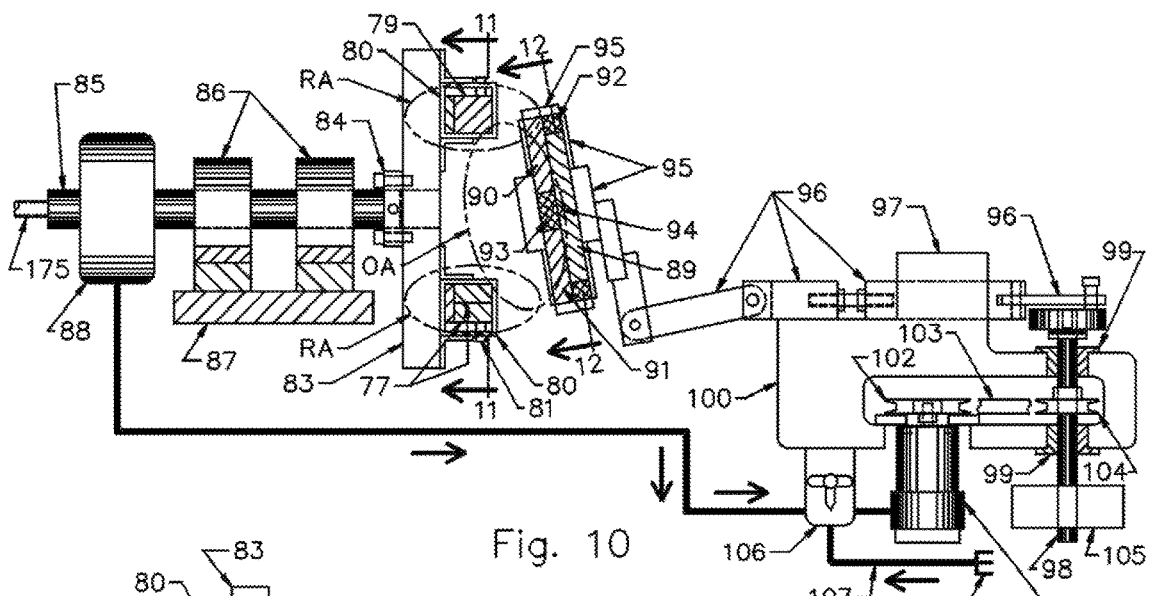
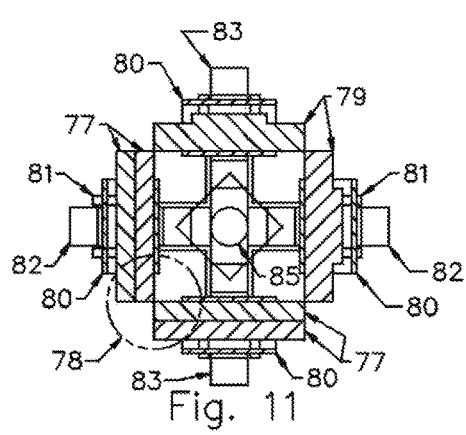
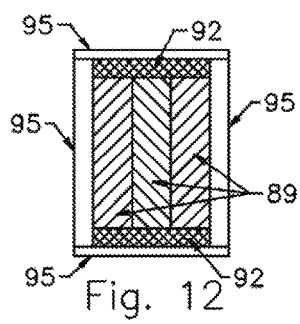
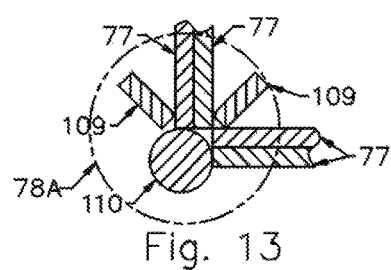

MAGNETIC DRIVE SYSTEM AND METHOD

This application claims priority to U.S. Provisional Patent Application Ser. No. 61/822,714 filed on May 13, 2013, and incorporated herein in its entirety by this reference thereto.

BACKGROUND OF THE INVENTION

1. Field of the Invention

The disclosed device relates to drive systems for communicating power which is communicated in a first direction to an output in a second direction. More particularly, it relates to a magnetic coupling system for converting power communicated in a first direction such as reciprocating along an axis, to a second direction such as circular. The communication of such force from the power between the two directional systems is provided through such magnetic coupling and without mechanical contact therebetween.

2. Prior Art

Communication of power to perform work frequently involves a change in direction of the communicated power to provide the force in a direction employable for a particular use. For instance, reciprocating motion, also called reciprocation, is a repetitive up-and-down or back-and-forth linear motion. It is found in a wide range of mechanisms, including reciprocating engines and pumps. The two opposite motions that comprise a single reciprocation cycle are called strokes.

A crank can be used to convert circular motion into reciprocating motion, or conversely turn reciprocating motion into circular motion. For example, inside an internal combustion engine (a type of reciprocating engine) the expansion of burning fuel in the cylinders periodically pushes the piston down, which through the connecting rod, turns the crankshaft. The continuing rotation of the crankshaft drives the piston back up ready for the next cycle. The piston moves in a reciprocating motion which is converted into a circular motion of the crankshaft which ultimately propels the vehicle or does other useful work. The vibrations felt when the engine is running are a side effect of the reciprocating motion of the pistons.

Another means for changing the direction or force of motion employed to communicate power from a source to perform work for example, is a gear train. Such gear train devices are formed operationally engaging gears operatively engaged with a support frame so that the teeth of the gears engage. Gear teeth are designed to ensure the pitch circles of engaging gears roll on each other without slipping. This provides a smooth transmission of rotation and power from one gear to the next and allows for gearing for torque and/or speed or other desired characteristics of the communicated power to perform work.

A vexing problem with such mechanical means for communicating motion to deliver power and changing the direction of the communicated power with gearing or rods and bearings is friction and resulting heat. Friction causes a waste of the communicated power to simply overcome the frictional drag on the system. Conventionally, such systems required significant lubrication and produce heat from friction. Excessive heat on the other hand can easily destroy the system when it reaches a level to damage meshing gears or reciprocating bearings.

International Application WO 2011/054062 of Radu teaches a concept of employing magnetic forces for a coupling in place of gearing and the like. The Radu device teaches the use of circularly positioned magnets to communicate motion and power from one set to the other by rotation. Other art exists for the purpose.

The forgoing examples of related art and limitations related therewith are intended to be illustrative and not exclusive, and they do not imply any limitations on the disclosed device and method of the invention described and claimed herein. Various additional limitations of the related art will become apparent to those skilled in the art upon a reading and understanding of the specification below and the accompanying drawings.

It is an object of this invention to provide a magnetic coupling or geartrain for communicating power in differing linear and rotational directions.

It is a further object of this invention to provide such a magnetic coupling between rotating and translating systems which minimizes generated heat and friction.

These and other objects, features, and advantages of the present apparatus and method of the disclosed invention, as well as the advantages thereof over existing prior art, which will become apparent to those skilled in the art from the description to follow, are accomplished by the novel improvements described in this specification and hereinafter of as described in the following detailed description which fully discloses the invention, which however in no manner should be considered as placing any limitations thereon.

SUMMARY OF THE INVENTION

Exemplary embodiments of the disclosed device relate generally to apparatuses and methods utilizing the compression of magnetic fields to generate continuous rotational or reciprocating motion.

Magnetic polarity is discussed throughout this specification. As used herein, a magnetic coupling having a compressive relation between the magnetic fields of the rotating assembly and those of an oscillating assembly are employed in various descriptions of the system and method herein. Such a compressive relation has overlapping magnetic fields from the magnets engaged with both the rotating and oscillating magnetic components. Additionally, the term common polarity means that at least one magnetic field of the rotor is oriented with the same polarity in respect to an adjacent oscillating magnetic field. Further, inverse polarity means that at least one magnetic field of the rotor or rotating component is oriented inversely or oppositely with respect to an adjacent oscillating magnetic field. As described herein, in some modes, the magnetic field communicating by the rotating magnet on the rotating assembly is a combination of common and inverse polarity with respect to the polarity of the oscillating magnetic fields of the magnetic component of the oscillating assembly. In each case, the magnetic fields of the rotor and oscillator are in compression with one another.

It is commonly known that a magnet has an ellipsoid-like field with a minor transverse axis, a major longitudinal axis, and magnetic poles located at the extremities of the major axis. Magnets attract ferrous objects like iron, steel, nickel and cobalt to their poles which are commonly referred to as North and South. Opposite magnetic poles attract one another and similar poles repel. Natural and manufactured magnets have permanent magnetic properties. Electromagnets are temporary magnets made from a coil of insulated copper wire wound on an iron core. Electromagnets have magnetic properties only when electric current flows in the coil. Magnets are vital to society and have many sizes, shapes, and uses.

Magnetic forces are concentrated at the poles, opposite in polarity, located on opposite ends of the magnet, and not continuous. The lack of continuous magnetic forces greatly limits the usefulness of magnetism. Currently, there is no common practice of efficiently combining magnetic forces to produce continuous rotary or linear motion. In order to overcome the shortcomings of discontinuous magnetic forces, I have devised a novel polar continuity apparatus that efficiently integrates magnetic forces and induces continuous rotary or linear motion.

The polar continuity apparatus of the disclosed device yielding the magnetic coupling is comprised of at least one oscillation assembly and a rotation assembly. Each assembly has magnetic components thereon which provide magnetic fields whereby the assemblies are engaged. The ellipsoidal-like magnetic fields each have a minor axis, a major axis, and poles located at the extremities of the major axis. Equilibrium is centered, between the poles. Each field has unbalanced regions, in either direction from equilibrium, that define polar domains that are dominated by the pole closest to the region. The magnetic fields of the rotation assembly are engaged in compression with the magnetic fields of the oscillation assembly transversely and generally in the direction of the minor (short) axis, thereby inducing expansion of the fields primarily through the major (long) axis, revolving the rotation assembly. The oscillation assembly compresses the volume of ellipsoidal-like magnetic fields alternately and in unlike polar domains, which directs magnetic field expansion force vectors to induce smooth, blended polar continuity and continuous 360 degree rotation of the rotation assembly or continuous reciprocating linear motion The disclosed polar continuity apparatus is the inverse of electromagnetic induction pioneered by Michael Faraday in 1831. Faraday's discovery rotates an armature between fields to induce alternating (oscillating) current. The present polar continuity apparatus oscillates magnetic fields adjacent to rotational fields to induce rotary motion.

With respect to the above description of the method and device therefor, before explaining at least one preferred embodiment of the herein disclosed magnetic drive system and method in detail, it is to be understood that the invention is not limited in its application, to the details of construction and to the arrangement of the components of the device and method disclosed, nor the steps in the method, in the following description or illustrated in the drawings. The invention herein described is capable of other embodiments and of being practiced and carried out in various ways which will be obvious to those skilled in the art upon reading this disclosure. Also, it is to be understood that the phraseology and terminology employed herein are for the purpose of description and should not be regarded as limiting.

As such, those skilled in the art will appreciate that the conception upon which this disclosure is based may readily be utilized as a basis for designing of other magnetic drive structures, methods and systems for carrying out the joint and several purposes of the present disclosed device and method herein. It is important, therefore, that the claims be regarded as including such equivalent construction and methodology insofar as they do not depart from the spirit and scope of the present invention.

An exemplary mode of the present magnetic drive device and method is adapted to integrate the unidirectional polar forces of magnetism to provide simple, inexpensive rotary and linear motion for powering useful equipment to benefit humanity. Another disclosed exemplary mode of the disclosed device is adapted to provide an educational tool for a greater understanding of science and magnetism. Other features and advantages of the present polar continuity apparatus and method will become apparent during consideration of the descriptions, drawings, and claims that follow.

BRIEF DESCRIPTION OF THE DRAWINGS

FIG. 2 is a sectional view through two ellipsoidal-like magnetic fields diagraming the force vectors induced by engagement.

FIG. 3 is a view of one of the ellipsoidal-like magnetic fields of FIG. 2 diagraming a method of altering the intensity and direction of the longitudinal force vector induced by engagement.

FIG. 4 depicts a compressive relation in the magnetic coupling achieved between the magnetic fields from magnetic components engaged with a rotor and those from magnetic components engaged with the oscillator as described herein and illustrates in the overlapping fields of hatched areas designated V1, V2, and V3 the compressed volumes of the oscillator and rotor fields graphically clarifying the smooth, blended transfer of the force vectors.

FIG. 10 is a sectional side elevation view of an oscillation assembly engaged with a rotation assembly.

FIG. 11 is a sectional view taken at line 11-11 of FIG. 10 showing an arrangement of the magnetic components of the rotation assembly.

FIG. 12 is a sectional view taken at line 12-12 of FIG. 10 illustrating an arrangement of the magnetic components of the oscillation assembly.

FIG. 13 is another arrangement of the magnetic components of FIG. 11 illustrating a method of shaping magnetic fields for increased intensity.

DETAILED DESCRIPTION OF THE PREFERRED EMBODIMENTS OF THE INVENTION

Figure 1:
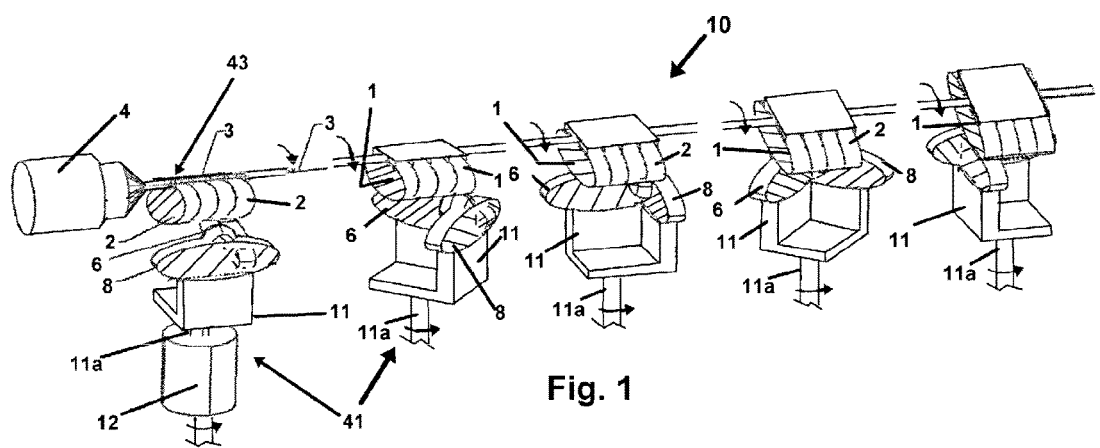
FIG. 1 is a general view of the polar continuity apparatus and the ellipse-like magnetic field engagement. Views of 5, 10, 15, and 20 degrees of progressive oscillation are depicted with corresponding movement of the rotating member.

Referring now to the drawings of FIGS. 1-22 which depict a number of preferred modes of the device 10 and method herein to achieve and employ a magnetic coupling, but which in no manner should be considered limiting. There can be seen in FIG. 1, and related drawings, one exemplary mode of the disclosed method and device 10 herein, wherein there is included at least one oscillation assembly 43, and one rotation assembly 41, wherein each have respective magnetic components that provide magnetic fields whereby the assemblies are engaged for operation. As depicted the ellipsoidal-like fields each have a minor axis, a major axis, and poles located at the extremities of the major axis. Equilibrium is centered between the poles. Each magnetic field has unbalanced regions in either direction from equilibrium that define polar domains that are each dominated by the pole closest to the region.

In operation, the magnetic fields of the rotation assembly 41 are operationally shaped and engaged in compression with the magnetic fields of the oscillation assembly 43 transversely and generally in the direction of the minor (short) axes. This configuration induces an expansion of the fields primarily through the major (long) axes, revolving the rotation assembly 41. The oscillation assembly 43 compresses the volume of the ellipsoidal-like magnetic fields alternately in dissimilar polar domains which direct magnetic field expansion force vectors to induce smooth magnetic coupling and blended polar continuity and continuous 360 degree rotation of the rotation assembly 41 or continuous linear motion of a reciprocating assembly depending on the mode of operation.

The rotation and oscillation assemblies each have at least one magnetic component or preferably a cluster of assorted shapes and sizes of magnetic components that generate magnetic fields. The magnetic components are mounted adjacent to one another with the magnetic fields in various degrees of compressive and expansive interaction. In this manner, magnetic field density is increased and the fields are intensified, shaped, and advantageously altered. Magnetic fields are formed into high intensity projections, bulges and elongations at specific locations to enhance a magnetic coupling between the assemblies to communicate power in a manner similar to gear teeth, and to further increase the velocity and torque of the rotation assembly or decrease the oscillation torque requirement.

The compressive engagement between the magnetic fields of the rotation and oscillation assemblies induces a magnetic coupling between the assemblies that communicates power between them but is void of physical material engagement. Powered movement of either one of the assemblies is transferred to its respectively engaged magnetic component and thereafter through the magnetic coupling therebetween to induce a corresponding movement of the other assembly. Additionally, a portion of the kinetic energy of the rotation assembly 41 is communicated to the oscillation assembly 43 through the formed magnetic field coupling. The magnetic coupling between emitted respective magnetic fields eliminates mechanical connections between both assemblies and the resulting physical part wear, and frictional losses which are all too common in physical connections of powered and power-requiring components.

As depicted in the exemplar drawings, a mode of the oscillation assembly 43 is pivotally or translationally engaged to a frame or other support to transfer magnetic field volumetric compression, alternately, from one polar domain of the engaged fields to the other during oscillating movement. The oscillation assembly 43 may be linked to a powered drive through any standard linkage such as a slider crank, scotch yoke, or cam mechanism operatively engaged with a motor or engine or other source of power for work. The oscillation assembly 43 drive thus in the mode shown herein, is operatively engaged with means inputting force from the power communicated from an adjustable speed AC or DC electric motor, however, other equivalents such as pneumatic, hydraulic, or electric linear actuator drives may be optionally employed.

The rotation assembly 41 is adapted to communicate powered rotation employable by equipment and devices, such as a pump or electric generator to do work. A portion of the output of powered equipment driven by the rotation assembly 41, is preferably routed to contribute to power the oscillations of the oscillator drive. A portion of the output current of an electric generator driven by the rotation assembly 41 for instance may be routed through a switch to the oscillator drive.

Additionally, the oscillator drive is adapted to connect to useful equipment and devices. The kinetic energy of the rotation assembly 41 returned to the oscillation assembly 41 through the formed magnetic coupling can contribute to drive useful equipment connected to the oscillation assembly 43.

At least one linear shuttle operatively engaged to one or a plurality of magnetic components is optionally employed to shuttle magnetic fields, similar to the motion of the oscillation assembly 43, in a polar continuity component. The shuttle may be driven by any common linear motion device such as a linear actuator, solenoid, pneumatic cylinder, or hydraulic cylinder. The linear shuttle provides magnetic field compression alternately in opposite polar domains, thereby inducing magnetic field expansion force vectors that revolve the rotation assembly 41 in the polar continuity component of the disclosed device.

The magnetic field components of the disclosed device are preferably permanent magnets, electromagnets, or a combination of each. Electromagnets may receive electric current during rotation through a slip device connected to the rotation assembly 41. The electric current supply to the electromagnets is activated or deactivated, sequentially by a controller, to energize the magnetic fields to induce and direct expansion force vectors for continuous rotary or linear motion. Electromagnets are optionally used in combination with permanent magnets in the oscillation and rotation assemblies of the disclosed device 10 and method herein.

The rotation assemblies 41 and the oscillation assemblies 43 of the system and method herein, in all modes, are situated in any directional orientation and are adapted to be adjustable toward or away from one another to increase or decrease the intensity of the magnetic field coupling between the assemblies.

Empirical data from testing confirms that the force required to cycle the oscillation assembly 43 remains substantially the same regardless of the load attached to the rotation assembly 41, up to the strength of the magnetic fields in generating the magnetic coupling between the two. This test establishes that the volumetric expansion of the magnetic fields through the major (long) axes defines a means for driving the rotation assembly 41. The force required to cycle the oscillation assembly 43 decreases as velocity of the rotation assembly 41 increases due to the kinetic energy transferred from the rotation assembly 41 to the oscillation assembly 43 via the magnetic coupling of the fields between them.

As further shown in FIG. 1 of the drawings the conceptual principles of polar continuity are depicted along with the basic components of an exemplary mode of the disclosed device 10 and method herein, which is adapted to be utilized to direct magnetic field expansion force vectors to induce continuous rotary motion in a magnetic coupling of components. As shown in FIG. 1, a rotation assembly 41 and an oscillation assembly 43 each having a shape to generate ellipsoidal-like magnetic fields 6 and 8 are operatively positioned for a magnetic coupling from a communication or compression of the projected magnetic fields with the other. The ellipsoidal-like fields 6 and 8 are shown as ellipses in cross section for clarity but can vary in shape from substantially elliptical. The magnetic components 5 and 7 will be shaped to generate such elliptical fields and currently are positioned on the rotational assembly 41 with their long axis being normal to each other or if not normal at least having axis lines extending traverse to each other.

The rotation assembly 41 of FIG. 1 has adjacent magnetic components 5 and 7, which emit respective rotational magnetic fields 6 and 8. The magnetic components 5 and 7 are mounted on a support 11, which includes a rotationally engaged output shaft 11a that may be linked to a power requiring device 12, such as a pump or electric generator for performing work. The rotational magnetic fields 6 and 8 are operatively positioned to communicate their respective magnetic fields in a communication or compression of repelling polarities with one another which forms the bulging, high-intensity area 9. The compression increases the density of the magnetic rotational fields 6 and 8 which boosts the strength and intensity of the fields. In addition, combinations of compressive and expansive relationships between rotational magnetic fields 6 and 8 are used to change the shape of the fields to enhance the magnetic coupling achieved between the rotation assembly fields 6 and 8 with the oscillation assembly magnetic fields 2 in the depicted stages of the magnetic coupling similar in operation to communicate power between components as gear teeth. Further, the increased intensity provides a proportional increase in velocity and torque of the rotation assembly 41. By rotational magnetic fields is meant, magnetic fields emitted from a magnetic component engaged in a mount with a rotational assembly 41, and by oscillating magnetic fields 2 is meant, magnetic fields emitted from a magnetic component which is engaged to an oscillation assembly 43.

The oscillation assembly 43 has one or preferably a plurality of magnetic components 1, which provide the magnetic fields 2. The magnetic components 1 are mounted adjacent to one another with their respective oscillating magnetic fields 2 in a communication or compression for increased intensity. The magnetic components 1 are optionally mounted in an arrangement of both repelling and attractive polarity to enhance the shape of the fields and to further increase field intensity. The magnetic components 1 are engaged with means for pivotal movement such as with two shafts 3. One of the shafts 3 is driven by an oscillation drive 4. The oscillation assembly 43 is adapted with supports (not shown in FIG. 1 for clarity) that restrain rotational motion.

As shown in the figures, the ellipsoidal-like magnetic fields 6, 8, and 2 of the rotation and oscillation assemblies 41 and 43 each have a minor axis, a major axis, and poles located at the extremities of the major axis. Equilibrium is centered between the extremities of the major axis. Equilibrium is centered, between the poles.

Each magnetic field has unbalanced regions in either direction from this point of equilibrium which define polar domains that are each dominated by the pole closest to the region. The magnetic fields of the rotation assembly are engaged in compression with the magnetic fields of the oscillation assembly 43 transversely and generally in the direction of the minor (short) axes, thereby inducing expansion of the fields primarily through the major (long) axes, revolving the rotation assembly 41. The oscillation assembly 43 compresses the volume of the ellipsoidal-like magnetic fields alternately in unlike polar domains, which directs magnetic field expansion force vectors to induce a magnetic coupling between the two and a smooth, blended polar continuity and continuous 360 degree rotation of the rotation assembly.

FIG. 1 further illustrates 5, 10, 15, and 20 degrees of oscillation assembly movement and the corresponding 45, 90, 135, and 180 degrees of rotation assembly movement counterclockwise, looking from the top. At the 20 degrees oscillation and 180 degrees rotation position, the oscillation assembly 43 reverses direction and returns to the 0 degree start position during which the rotation assembly 41 is continuously propelled in a direction 180 degrees counterclockwise, looking from the top, completing a 360 degree revolution of the rotation assembly 41.

The foregoing ratio of oscillation to rotation is an actual test result that has been found to be due to the elliptical shape of the fields which provide a favorable proportion of compression, by way of the minor (short) axes, compared with expansion, by way of the major (long) axes. A comparison of the compressed distance "X" to the expanded distance "Y" is given in FIG. 2. In addition, the fields are arranged to induce a twisting movement or torque to the rotation assembly 41 coincident with the field expansion. A detailed magnetic field force vector diagram comparing compression to expansion is provided in FIGS. 2, 3, 5, and throughout the description.

An analysis of directing the magnetic field expansion force vectors to induce polar continuity is given in FIG. 4 which depicts a compressive relation between the magnetic fields of the rotor and those of the oscillator. Such as described herein, FIG. 4 illustrates in the overlapping fields of hatched areas designated V1, V2, and V3, the compressed volumes of the oscillator and rotor magnetic fields which result in the smooth, blended transfer of the force vectors in the formed magnetic coupling in the depicted fashion.

The oscillation and rotation assemblies in their magnetic coupling, are each preferably mounted upon bearings and are adapted with supports that provide adjustment of one assembly towards or away from the other assembly to increase or decrease the degree of compression of the magnetic fields during operation. The adjustable support and positioning is well known in the art and accomplished with slotted connections, keyways, rails, shafts, threaded screws, cams, linear actuators, pneumatic cylinders, hydraulic cylinders, or the like, which connect to one of the assemblies for linear adjustment during operation. Bearings and linear adjustments which are well known in the art not shown in FIG. 1 for clarity and because those skilled in the art are quite familiar with the many means for adjustable positioning of a rotating or oscillating component and need not be depicted. FIG. 10 illustrates bearings and a simple method of linear adjustment of one of the assemblies.

It is preferred that the magnetic fields of the oscillation assembly 43 with respect to the magnetic fields of the rotation assembly 41 are oriented to repel one another. However, a mixture of both attractive and repelling polarity of the magnetic fields may be employed advantageously to alter the shape and intensity of the respective projected magnetic fields and to propel the rotation assembly 41.

The interactive motion and the direction of force vectors in the device 10 and method for magnetic coupling herein are shown in FIGS. 2 and 4 together. In FIG. 2 is illustrated common polarity between the oscillating magnetic fields 2, and the rotating magnetic fields 6. In this case the fields are in a compressive-repelling relation. The magnetic field directional arrows 23 further depict repelling of oscillating magnetic fields 2 and rotating magnetic fields 6. In this case, longitudinal restraint of the rotor and oscillator from release of compressive-repelling magnetic field relation is provided by a bearing member, end stop, or the like.

Inverse polarity is similar to that depicted in FIG. 2 except the polarity between the oscillating magnetic fields 2 and adjacent rotating magnetic fields 6 is opposite, and the directional arrow of rotating magnetic field 6 is turned 180 degrees from the orientation shown in FIG. 2. In this case, the oscillating magnetic field 2 and rotating magnetic field 6 are in a compressive-attractive relation and have similar force vector interaction as previously discussed for that of common polarity.

A combination of inverse polarity and common polarity has shown in experimentation to be a potent advantage in engine design. This innovation provides rotor propulsion by pushing magnetic fields in repelling polarity simultaneous with a pulling of magnetic fields in attractive polarity. Such a combination of common and inverse polarity of rotating magnetic fields 6 and the rotor longitudinal restraint has been successfully tested in the device 10 and method herein. Two rotating magnetic components of repelling polarity and two with attractive polarity, with respect to the oscillating magnetic fields 2, are engaged with the rotating assembly 41. Two attractive magnetic fields have replaced two copper counterweights in the square configuration as can be seen in the drawings and is discussed later herein.

As can be seen, FIG. 2 is a force vector diagram and FIG. 4 is a magnetic field diagram. FIG. 2 is a section view taken through two ellipsoidal-like magnetic fields, shown as the oscillating magnetic field 2 and the rotating magnetic field 6, also shown in FIG. 1. FIG. 2 diagrams the force vectors 18 and 19 derived from compressing the oscillating magnetic fields 2 of the oscillator assembly 43 into the rotatable or rotating magnetic fields 6 from the magnetic components engaged with the rotation assembly 41 and shows the induced expansion force vectors 20 and 21. The oscillation assembly 43 magnetic field 2 is shown oscillated with respect to the rotation assembly magnetic field 6 at an arbitrary angle similar to the relationship shown in FIG. 1 at the 20 degree oscillation and 180 degree rotation position. The coupling resulting from compressing the oscillating assembly 43 and oscillating magnetic field 2 into the rotating magnetic filed 6 emitted from the magnetic component engaged with the rotating assembly 41, is illustrated with force vectors 18 and 19, respectively, and is not shown with overlapping ellipses for clarity. FIG. 4 illustrates the magnetic field ellipses communicated from the magnetic components respectively engaged with an oscillating assembly 43 and a rotating assembly 41 and their stages of compression at three stages of oscillation, without showing the force vectors for clarity.

The oscillator assembly 43 magnetic component 25 communicates the oscillating magnetic field 2 during any oscillation of the oscillating assembly 43, which has a minor axis 15 that is centered between the north and south poles and extends transversely across the field defining the equilibrium position. Additionally, the oscillating magnetic field 2 has a major axis 16 that is centered between the limits of the minor axis and extends longitudinally to the extremities of the field. The rotation assembly 41 has engaged magnetic components 24, which communicate or emit a rotating magnetic field 6 during rotation of the rotation assembly 41, that similarly has minor axis 13 and major axis 14. The oscillation of the oscillating magnetic field 2 causes the minor axes, 13 and 15, to be offset a short distance from one another to induce the unbalanced forces of the magnetic fields.

The direction of the offset of the minor axes, 13 and 15, determines the direction of rotation and the direction of the resultant force vector 22. The oscillating magnet field 2 and the rotating magnetic field 6 are oriented in a repelling relationship as shown by the north and south designations and the field direction arrows 23. The respective oscillating magnetic fields 2 and rotating magnetic fields 6 are compressed together by the oscillator force vector 17 which squeezes the fields into one another approximately the length of the input force vectors 18 and 19. The compression of the fields densities the energy which induces expansion of the fields generally parallel to their major axes 14 and 16, thereby inducing the unbalanced force vectors 20 and 21. The oscillator magnetic component 25 causing the projected oscillating magnetic field 2 are laterally restrained, which provides a fixed reaction for the forces induced by the expansion of the fields and directs force vectors 20 and 21 to revolve the rotation assembly. The longitudinal expansion of the oscillating field 2 and rotating magnetic field 6 toward equilibrium is directed by both the compression of the fields and the fixed reaction of the restrained oscillator assembly.

The force vectors 20 and 21 are further clarified by comparing FIG. 2 with 4. Referring to the view labeled "end first oscillation stroke" of FIG. 4, the compressed volumes V1 and V2 of each field expand concurrently to expel the rotating magnetic field 6. The expansion of oscillating magnetic field 2 reacts against its lateral restraint inducing the force vector 21, which expels the rotating magnetic field 6 in the direction of resultant vector 22 of FIG. 2. Concurrently, the expansion of rotating field 6 reacts against the restrained oscillating magnetic field 2 inducing the force vector 20 which expels the rotating magnetic field 6 in the direction of the resultant force vector 22 of FIG. 2.

Therefore, the energy of each respective magnetic field forming a magnetic coupling, is directed to the engaged rotation assembly through the most direct path to equilibrium which is by way of the longitudinal axes of the fields. Additionally, FIG. 2 shows a plurality of force vectors 26, which are shown to illustrate that the induced magnetic field expansion occurs concurrently with the compression force vector 19. The simultaneous action of the force vectors 19 and 26 are an important feature that contributes to providing smooth, blended polar continuity and a magnetic coupling yielded by the apparatus of the disclosed device and method.

FIG. 3 illustrates two sectional views through the substantially ellipsoidal rotating magnetic field 6. One of the sections shows the rotating magnetic field 6 with the compression force vector 19 and the longitudinal expansion force vector 20 as previously discussed in FIG. 2. The other sectional view illustrates the alteration of the intensity, shape and direction of the expansion force vector of the rotating magnetic field 6. These alterations are achieved by selectively compressing the magnetic field 159 into the rotating magnetic field 6 which changes the equilibrium of the field and creates the intense bulging area 160. The change in equilibrium alters the direction of the longitudinal expansion vector 20 causing it to become a new force vector 161 which is directed approximately 30 degrees from the longitudinal axis as shown. The intensification of magnetic fields and the capability to direct force vectors are useful components in the polar continuity apparatus of the disclosed device. FIG. 4 is a magnetic field diagram of three positions of oscillation of the oscillating magnet field 2 caused by oscillation of the oscillating assembly, with respect to rotating magnetic field 6 in the magnetic coupling formed.

FIG. 4 is clarified by FIG. 1, which also shows oscillating magnetic fields 2 and rotating magnetic fields 6. The oscillating magnetic fields 2 and rotating magnetic fields 6 are shown in a magnetic coupling engaged in compression as previously discussed. The three views of FIG. 4 each have an oscillating magnetic field 2, rotating magnetic field 6, minor axes 13 and 15, and major axes 14 and 16. The start oscillation view illustrates the compressed volumes labeled V1 and V2 which direct magnetic field expansion force vectors as described in FIG. 2. The polar shift position shows the compressed magnetic field volumes V3 being equal about the minor axes. The polar shift position clearly illustrates the integration of magnetic poles in the polar continuity apparatus.

FIG. 1 shows the polar shift position at 10 degrees oscillation and a 90 degree rotation. The end first oscillation stroke view is shown in FIG. 1 at 20 degree oscillation and 180 degree rotation. This view shows the compressed volumes V1 and V2 reversed with respect to the start oscillation view. Therefore, the oscillation assembly 43 compresses the volume of ellipsoidal-like magnetic fields in their respective couplings, alternately in unlike polar domains, which directs field expansion force vectors to induce smooth, blended polar continuity and continuous 360 degree rotation of the rotation assembly.

Figure 5:
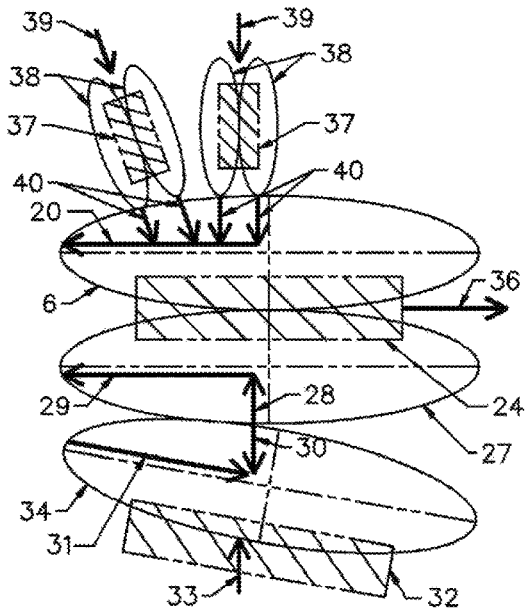
FIG. 5 is a sectional view through another arrangement of ellipsoidal-like magnetic fields and shows the force vectors induced by engagement.

FIG. 5 is a force vector diagram similar to FIG. 2 except the FIG. 5 mode utilizes both upper and lower oscillation assemblies 43 and an assortment of engaged magnetic components. FIG. 5 illustrates seven ellipsoidal-like magnetic fields acting in cooperation to induce the resultant force vector 36 and power the rotation assembly 41. Any suitable combination of shape, size, and quantity of magnetic components with fields are adapted to induce expansion for a magnetic coupling employable in the polar continuity apparatus of the disclosed device may be employed.

FIG. 5 shows an intermediate magnetic component 24 having an upper rotational magnetic field 6 and also a lower field 27 that are propelled in the direction of the resultant force vector 36. The upper oscillation assembly 43 has two magnetic components 37 with fields 38 that are oscillated in compression with field 6 to approximately the depth of vectors 40 by oscillation force vectors 39. The compression of fields 38 and communicating rotational magnetic field 6 induce the expansion vector 20 which reacts against the fields of the laterally restrained magnetic components 37 and contributes to propel the operatively engaged rotation assembly in the direction of the resultant vector 36. The lower oscillation assembly 43 has magnetic component 32 with field 34 that is oscillated in compression with field 27 approximately the depth of vectors 28 and 30 by oscillation force vector 33.

Figure 6:
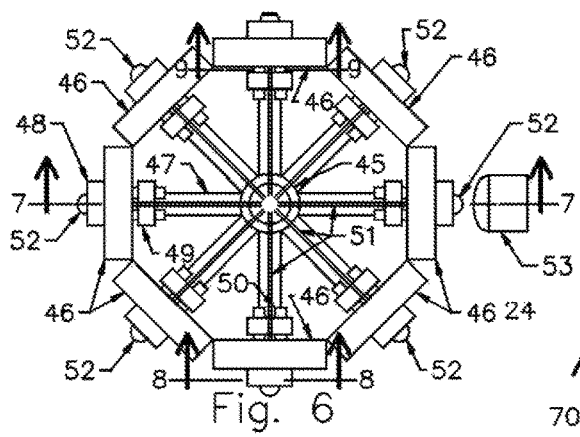
FIG. 6 is a top view of a rotation assembly illustrating an array of permanent or electromagnetic components.

The compressed field 34 induces the expansion vector 31 which reacts against the laterally restrained magnetic component 32 and propels the field 27 in the direction of the resultant vector 36. The compressed field 27 induces the expansion vector 29 which reacts against the laterally restrained field 34 and propels the field 27 in the direction of the resultant vector 36. Each magnetic field expansion force vector thus contributes to propel the rotation assembly. Therefore, magnetic field compression and induced expansion are used concurrently in a plurality of directional orientations with an assortment of shapes and sizes of magnetic components in the polar continuity apparatus of the disclosed device. FIG. 6 is a top view of a rotation assembly of the disclosed device clarified by the sectional elevation view of FIG. 7.

Figure 7:
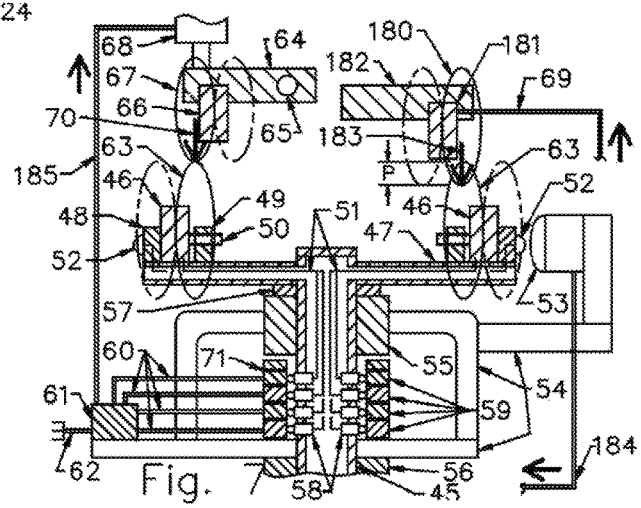
FIG. 7 is a sectional view taken at line 7-7 of FIG. 6 and illustrates an oscillation and rotation assembly of permanent or electromagnetic components.

FIGS. 6 and 7 are particularly suited for electromagnetic propulsion of the rotation assembly 41 through the disclosed magnetic coupling. However, this mode is useful for permanent magnetic components or a combination of each. A switch connects or disconnects electric current to electromagnetic components to activate or deactivate magnetic fields at selective intervals to induce polar continuity and continuous rotation of a rotation assembly. Electromagnetic fields are activated when they overlap in a manner similar to the relationship of the fields of FIGS. 2 and 4 which produce force vectors and expansion. Conversely, electromagnetic fields are deactivated to provide clearance for rotation between the fields in a manner similar to the clearance obtained from oscillation.

In FIGS. 6 and 7, the electromagnetic fields in combination with permanent magnetic fields are situated to overlap one another in the same direction and at approximately the same depth as the input force vectors 18 and 19 shown in FIG. 2, and the fields of FIG. 4. FIG. 7 shows the electromagnetic field 180 overlapping field 63 by distance P. The electromagnetic fields are selectively activated to induce expansion of the fields after which they are deactivated to provide clearance between fields for revolving the rotation assembly. The overlap distance P of the electromagnetic fields 63 and 180 of FIG. 7 clarifies the interference between fields which restricts rotation. Clearance is obtained by deactivating the electromagnetic fields at appropriate intervals by oscillating the fields above the restrictive fields or by turning the fields askew of one another for clearance.

FIG. 6 has eight electromagnetic components 46 also shown in FIG. 7. Each electromagnet component 46 is supported upon a hollow tubular arm 47 which is attached centrally to a hollow output shaft 45. Each electromagnetic component 46 is supported adjacent to a vertical support 48 by a clamp screw 50 and clamp plate 49. Each rotational electromagnetic component is equipped with electrical circuit wires 51 that are routed through the hollow arm 47 upon which it is supported, and through the hollow shaft 45 to a spring loaded electrical contact 58 that is preferably threaded into the wall of the shaft 45 and soldered in place to resist vibration. The tip of each electrical contact 58 is adapted to slide upon the inner diameter of electrical conductive rings 59 under spring pressure. The conductive rings 59 are electrically isolated from one another with nonconductive isolators 71. Each conductive ring 59 is adapted to receive electrical circuitry 60 which is routed to a selective switch 61 which is supplied with electric current through a conductor and plug 62. The conductive rings 59 and isolators 71 are affixed to the frame 54. The electromagnets 46, hollow arms 47, hollow shaft 45 and electrical contacts 58 revolve upon bearings 55 and 56 and thrust bearing 57. The rotation assembly is equipped with a plurality of electric sensors 52 that cooperatively communicate with a fixed electric sensor 53, the selective switch 61, upper electromagnetic components 181 and upper permanent magnet actuators 68 through the electric circuits 51, 60, 184, 185, and 69. The sensors 52 and 53 communicate the orientation of the electromagnetic or permanent magnetic fields with respect to one another and selectively activate electric current to flow through the circuitry to the rings 59, contacts 58, and magnetic components to activate or deactivate electromagnetic fields or to actuate an oscillator assembly in a polar continuity apparatus of the disclosed device.

The upper right portion of FIG. 7 shows a fixed arm 182 which supports the electromagnetic component 181 in an appropriate orientation with the rotation assembly magnetic components 46 to produce polar continuity as previously described. The sensors 52 and 53 signal the selective switch 61 to connect or disconnect electric current through circuit 69 which activates or deactivates the electromagnetic field 180 and initiates the input force vector 183 at an appropriate interval. One upper electromagnetic component 181 is shown in FIG. 7; however, a plurality may be positioned relative to the rotation assembly fields in the polar continuity apparatus.

The upper left portion of FIG. 7 shows an oscillator-assembly with a support arm 64 that moves about pivot 65 and is powered by an electric linear actuator 68, solenoid, pneumatic cylinder or hydraulic cylinder. The arm 64 supports a permanent magnet 66 that provides the magnetic field 67. The sensors 52 and 53 signal the switch 61 to connect electric current to the actuator 68, which oscillates the magnetic field 67 into the rotation assembly magnetic field 63 at the appropriate interval and initiates the input force vector 70. The unbalanced force 70 induces the fields to expand longitudinally which contributes to revolve the rotation assembly. One upper oscillator assembly comprising 64, 65, 66, and 68 is shown in FIG. 7; however, a plurality which have permanent or electromagnetic components are positioned relative to the rotation assembly fields in the polar continuity apparatus of the disclosed device.

Figure 8:
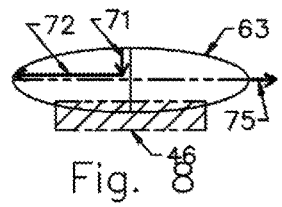
FIG. 8 is a sectional view through the ellipsoidal-like magnetic field taken at line 8-8 of FIG. 6 and illustrates the forces vectors induced by engagement with magnetic fields to revolve the rotation assembly.
Figure 9:
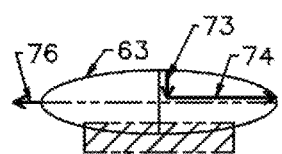
FIG. 9 is a sectional view through the ellipsoidal-like magnetic field taken at line 9-9 of FIG. 6 and illustrates the force vectors induced by engagement with magnetic fields to revolve the rotation assembly.

FIGS. 8 and 9 are sectional elevation views taken at lines 8-8 and 9-9, respectively, illustrating the rotation assembly's magnetic components 46 and fields 63. FIG. 8 shows the input force vector 71 on the left side of the minor axis of the field, which induces the expansion vector 72 contributing to the resultant vector 75, which revolves the rotation assembly counter clockwise looking from the top. FIG. 9 shows the input force vector 73 on the right side of the minor axis of the field, which induces the expansion vector 74 contributing to the resultant vector 76, which works together with vector 75 to revolve the rotation assembly counter clockwise looking from the top.

FIG. 10 is a sectional side elevation of a preferred mode of a rotation assembly engaged with an oscillator assembly in the polar continuity apparatus. The rotation assembly is further clarified by FIG. 11 taken at line 11-11 of FIG. 10. FIG. 11 shows four magnetic components 77 stacked in pairs in common, or attractive polarity for increased intensity of the magnetic fields at two locations approximately 90 degrees with respect to one-another and situated generally the same distance about a centrally oriented output shaft 85. Two nonmagnetic counterweights 79 preferably of copper or brass material are situated opposite the magnetic components 77 approximately 90 degrees with respect to one another and located generally the same distance about the shaft 85 as magnets 77. The counterweights 79 and magnets 77 form a square configuration that is centered and in rotational balance about the shaft 85. A square is preferred; however, a wide range of geometric shapes, such as circular, triangular, rectangular, oblong, or regular convex or complex polygons are functional in the polar continuity apparatus of the disclosed device.

Each magnet 77 and counterweight 79 is supported within a tube 80 and clamped therein with screws 81 preferably of nonmagnetic material. Four tubes 80 are each mounted near the extremities of a horizontal arm 82 and a vertical arm 83 that are attached to the output shaft 85 by a connecting plate 84. The arms 82 and 83 are centered and in balance about the shaft 85 and extend outward to support tubes 80. The output shaft 85 is adapted to slide longitudinally in bearings 86 that are supported by frame member 87. The bearings 86 or frame 87 are optionally adapted for longitudinal adjustment of the rotation assembly.

The output shaft 85 is directly connected to a useful device such as a pump or electric generator 88 or the connection is one of many commonly used linkages such as a belt, chain, or gear drive transmission. The shaft 85 is abutted at its end against the output of a linear actuator 175 which slides the rotation assembly longitudinally relative to the oscillator assembly during operation to adjust the degree of compression between the rotation assembly magnetic fields referenced as RA and the oscillator assembly magnetic fields referenced as OA. The linear actuator 175 is optionally a threaded screw mounted in a support plate, a pneumatic cylinder, or a hydraulic cylinder. Adjustment of the distance between the magnetic fields during operation regulates the magnetic force between the two assemblies and is a desirable feature in the polar continuity apparatus of the disclosed device.

Magnetic fields naturally extend substantially beyond the physical boundaries of the magnetic components from which they originate. These fields are shaped, intensified, and advantageously altered by mounting the magnetic components with their extended fields in various degrees of compression and expansion that form high intensity projections, bulges, and elongations that enhance engagement, similar to gear teeth and gaps, and which further increase the velocity and torque of the rotation assembly. Magnetic field intensification is achieved with both permanent and electromagnets or a combination of each.

Also in the configuration of FIG. 11 is shown an area of magnetic field intensity 78 that is formed by mounting the fields of magnets 77 together, and in compression at their intersecting adjacent corners. Also shown are the counterweights 79 which in a current mode work well formed of copper. It should be noted, however, that while the depicted configuration of FIG. 11 shows this mode of magnets 77 stacked in polarity and counterweights 79, recent experimentation has shown that the counterweights 79 instead of being copper or brass or other nonferrous metals, may also may be formed of magnets, also stacked in polarity, but in a polarity opposite that of the stacked polarity of the magnets 77 on the opposing side. Experimentation has shown this configuration to provide a smoother magnetic coupling wherein the stacked magnets 77 project a field acting akin to the teeth on a gear, and the opposing stacked magnets positioned in place of the counterweights 79, act in a fashion similar to the recess between teeth on a gear in the magnetic coupling.

FIG. 13 shows a high intensity magnetic field area 78A which is a further alteration of the intensity of the magnetic field area 78 of FIG. 11. The high intensity area 18A is produced by mounting additional magnetic components 109 and 110 adjacent to magnets 77 in either attractive or repelling polarity to alter the shape, increase the compression, and to amplify the intensity of each magnetic field.

The oscillator assembly of FIG. 10 is further clarified by FIG. 12, which is a sectional view taken from FIG. 10 at line 12-12. The oscillator assembly consists of a plurality of magnetic components 89, 90, and 91 that are stacked and squeezed together adjacent to one another in a compression to intensify magnetic field strength. The magnetic components 89, 90, and 91 are retained in compression in an enclosure 95, which prevents the magnets from bursting from the apparatus. The magnetic components are positioned for maximum intensity within the enclosure 95 with spacers 92 and 93. The enclosure 95 oscillates about the pivot 94 approximately 20 degrees clockwise and 20 degrees counterclockwise engaging the magnetic fields generally equally. Oscillation compresses the magnetic fields of the two assemblies together producing the input force vectors that induce the expansion force vectors described in FIGS. 2 and 4. The counterweights 79 of FIGS. 10 and 11 provide a nonmagnetic area that allows clearance between magnetic fields for free movement of the rotation assembly. Referring to FIGS. 1, 10 and 11, 20 degrees of clockwise oscillation induces 180 degrees of rotation and a following 20 degrees of counterclockwise oscillation induces a second 180 degrees of movement of the rotation assembly in the same direction. FIG. 1 illustrates an oscillation compression stroke that induces magnetic field expansion and propels the rotation assembly typical of the mode shown in FIGS. 10 and 11. FIGS. 1, 10 and 11 are preferred arrangements of magnetic components; however, other arrangements such as replacing the counterweights 79 with magnets or retraction of magnets with mechanisms and electric devices are within the scope of the polar continuity apparatus of the disclosed device.

The oscillator of FIG. 10 is driven by a typical slider crank mechanism consisting of a linkage 96 that is supported within a bearing 97 that is mounted upon frame 100. The linkage 96 connects the enclosure 95 to a rotating member 98 via a shoulder screw. The rotating member drives oscillation of the enclosure 95 about the pivot 94 similar to a standard slider crank apparatus. A scotch yoke, cam, or a linear actuator mechanism is optional. The rotating member 98 is supported upon two bearings 99 that are mounted in the frame 100. The rotating member 98 is preferably driven by a variable speed electric motor 101 that is linked to the member 98 through a belt 103 and pulleys 102 and 104.

An electric generator 88 is mounted on the output shaft 85 of the polar continuity apparatus and is connected to a switch 106 that is cooperatively wired to the motor 101 and an electric power supply through wire 107 and plug 108. The switch 106 connects the motor 101 to an electric power source through 107 and 108 or to the electric power output of generator 88. Additionally, an electric generator or other equipment 105 is directly mounted or linked to rotating member 98.

Figure 14:
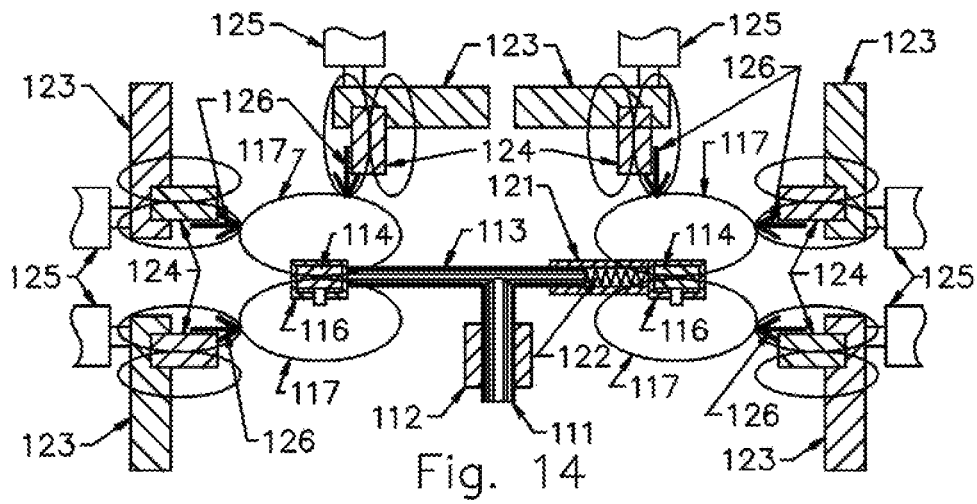
FIG. 14 is a sectional side elevation view of another arrangement of the magnetic components of a rotation assembly engaged with various oscillation assemblies.

FIG. 14 is a sectional side elevation view illustrating the engagement of the magnetic fields of multiple oscillator assemblies with the fields of a rotation assembly. Two rotation assembly magnetic components 114 are shown mounted in holders 116 that are supported by tubes 113, similar in plan to the tubes 47 shown in FIG. 6. Tubes 113 are centrally supported on a pivot shaft 111 which rotates in a bearing 112. The rotation assembly's magnetic components provide the magnetic fields 117, which are engaged by the magnetic fields of six oscillator assemblies. Each oscillator assembly has an oscillation arm 123, at least one magnetic component 124, and an oscillation drive 125 which is a linear actuator, solenoid, cylinder, cam, slider crank, or the like. The oscillator assembly magnetic fields 2 envelope the rotation assembly fields 6, in a relationship as shown in FIGS. 2 and 4 wherein compressive oscillation of the fields or reciprocating compression between fields provides the input force vector 126 that induces longitudinal expansion of the fields which propels the rotation assembly. Reciprocating compression squeezes and retracts the magnetic fields linearly to induce longitudinal expansion of the fields. The drive 125 of each oscillator assembly is activated in an orderly sequence to facilitate rotary motion of the rotation assembly. The engagement of multiple magnetic fields in sequential compression and expansion increases the torque of the rotation assembly which is an advantage of the polar continuity apparatus of FIG. 14.

The tube 121 is loaded with the spring 122 to illustrate another mode of retraction and advancement of magnetic components in a polar continuity apparatus of the disclosed device. The spring 122 extends the magnetic component 114 and fields 117 to the start of the compression stroke after the field expansion is complete.

Figure 15:
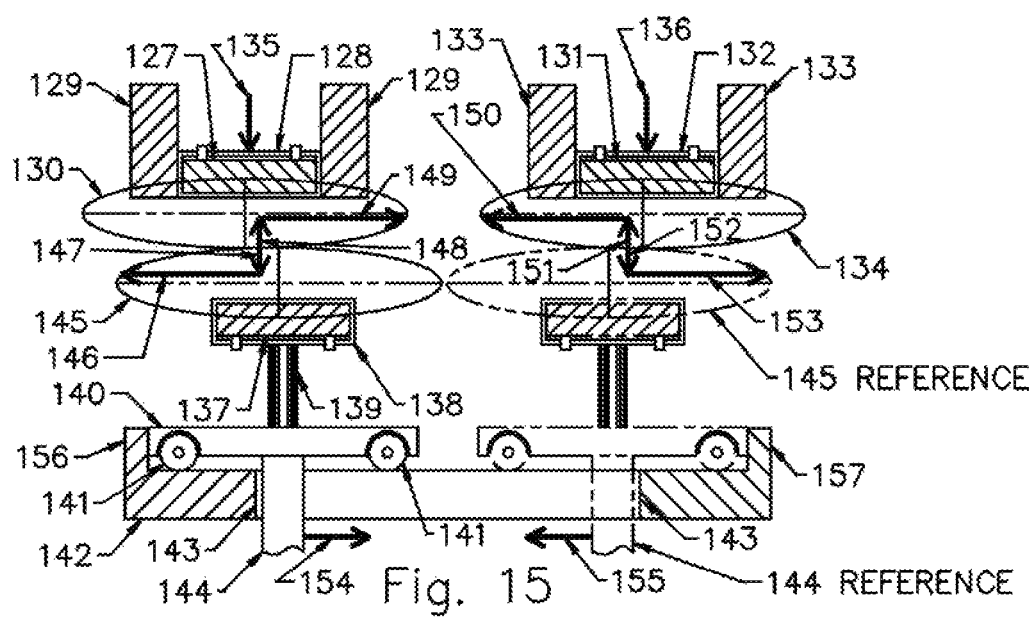
FIG. 15 is a sectional side elevation view of an arrangement of magnetic components for continuous reciprocating linear motion.

FIG. 15 is a sectional side elevation view of a mode of magnetic components yielding a magnetic coupling employable for continuous reciprocating linear motion rather than communicating the force to yield rotational motion as noted in other modes. As shown, the reciprocation assembly includes a reciprocating magnetic component 137 which is retained in a holder 138 that is supported on a column 139 attached to a carriage 140 with rollers 141. The carriage 140 is guided in a containment 142 that has a slot 143 and end stops 156 and 157. The oscillating magnetic component 127 provides the field 130 and is retained in a holder 128 that has lateral restraints 129. The oscillation and reciprocating magnetic fields 130 and 145, respectively, are situated in a similar relationship as described in FIGS. 2 and 4. The oscillation force vector 135 compresses the fields 130 and 145 producing the input force vectors 147 and 148, which induce the expansion vectors 146 and 149 that translate the reciprocating component shown as the carriage 140 and the output bar 144 in the direction of the force vector 154, until the carriage arrives at the end stop 157 completing the forward stroke.

Means to reverse the translation may be provided by a spring or other biasing means or by a second oscillation assembly situated at the end of the forward translation to reverse the direction of movement and return the carriage 140 to the starting position adjacent to the end stop 156. The second oscillation assembly consists of the magnetic component 131 that provides the field 134 and is retained in the holder 132 that has lateral restraints 133. The oscillation and reciprocating magnetic fields 134 and 145, respectively, are situated similarly to fields 130 and 145 except the opposite polar domain of each field is used to induce expansion of the fields and motion in the reverse direction as shown. At the appropriate sequence of operation, the oscillation force vector 136 compresses the fields 134 and 145 producing the input force vectors 151 and 152 which induce the expansion vectors 150 and 153 that propel the carriage 140 and the output bar 144 in the direction of the force vector 155 until the carriage arrives at the start position adjacent to the end stop 156 completing the return stroke. Additional magnetic components and fields in numerous directional orientations are assembled to induce various lengths and segments of reciprocating linear motion in the polar continuity apparatus of the disclosed device. Further, reciprocating linear motion is induced with compressive oscillation of the magnetic fields, similar to FIGS. 2 and 4, or reciprocating compression which squeezes and retracts the fields linearly.

Linear motion is used to compress the magnetic fields of a magnetic component assembly into the magnetic fields of a rotation assembly in a polar continuity apparatus. The linear motion is provided by a linear actuator, solenoid, cylinder, or the like. A single linear motion actuator moves from one magnetic field polar domain to the adjacent polar domain compressing and releasing the magnetic fields to produce the input force vectors and induce field expansion as described in FIGS. 2 and 4. Optionally, two linear motion actuators cooperatively compress and release magnetic fields in adjacent polar domains similar to the interaction of the magnetic fields of the oscillation and rotation assemblies of the disclosed device.

Figure 16:
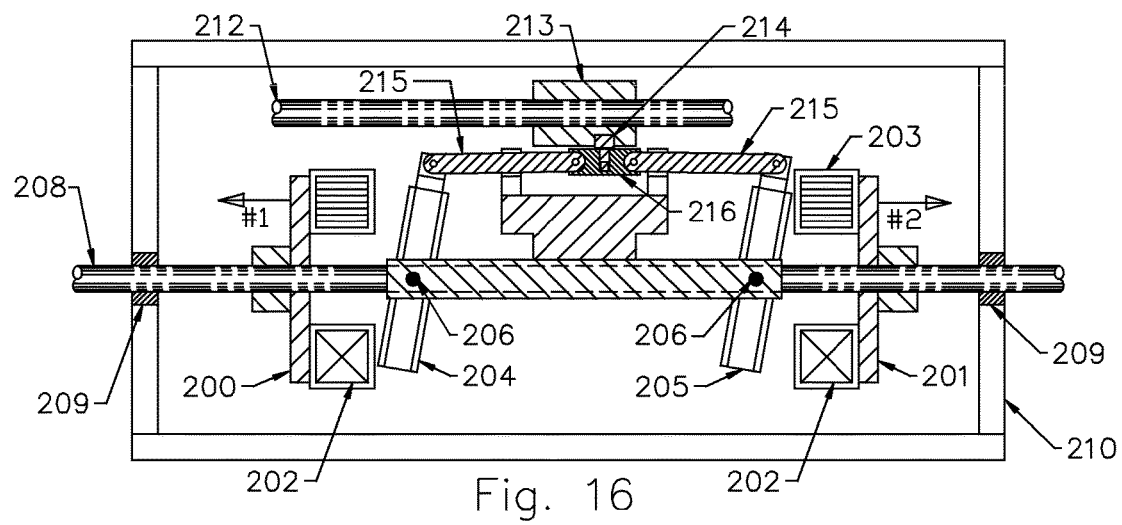
FIG. 16 depicts a sectional view showing the movement of magnets engaged with the oscillation assembly.
Figure 17:
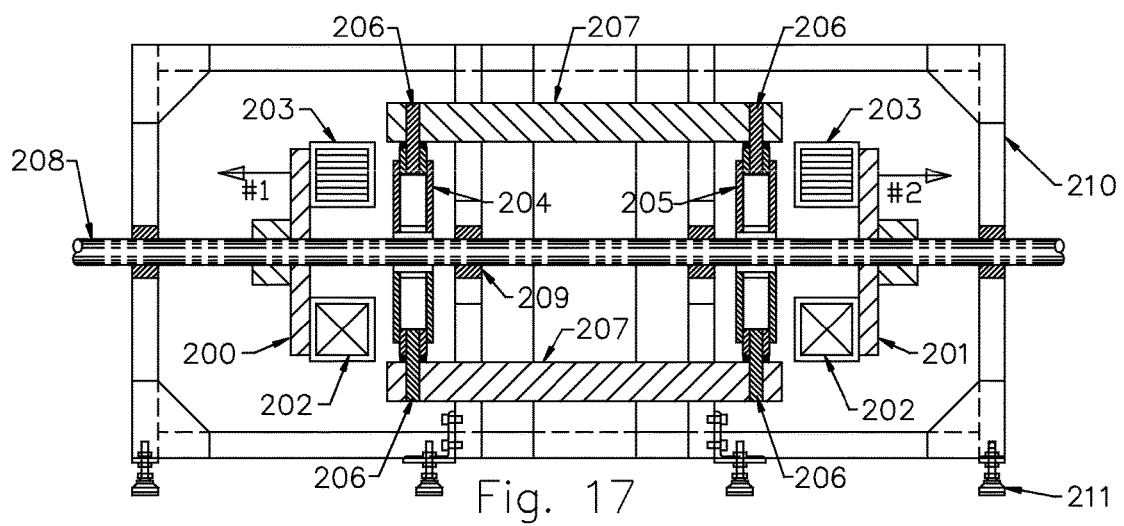
FIG. 17 shows another sectional view of a representative mode of the device.

A plurality of rotation assemblies with corresponding oscillation assemblies of the disclosed device are cooperatively linked to a common shaft for a further increase in output torque. FIGS. 16 and 17 of the drawings are plan and elevation views, respectively, of an apparatus of the present invention illustrating multiple sets of rotation and oscillation assemblies engaged for increased output torque, minimum friction loss, and sequential magnetic field expansion. As can be seen, FIGS. 16 and 17 illustrate the assembly in a frame 210 with swivel feet 211.

FIGS. 16 and 17 illustrate a first rotation assembly 200 engaged with a first oscillation assembly 204 linked to a second rotation assembly 201 engaged with a second oscillation assembly 205. The first set of assemblies comprise a rotation assembly 200 which has at least one magnetic field from magnets 202, which are engaged in a compressive, unbalanced relation, with the magnetic fields of oscillation assembly 204. The front view of the rotation assemblies 200 and 201 are similar to FIG. 11 of the drawings. Non-magnetic counter-weights are shown as 203.

The second set of assemblies comprise a rotation assembly 201 which has at least one magnetic field engaged in a compressive, unbalanced relation with the magnetic fields of oscillation assembly 205.

The first and second rotation assemblies 200 and 201, respectively, are mounted upon a common output shaft 208 which is supported by bearings 209. The first and second oscillation assemblies 204 and 205, respectively, are each pivotally supported by an upper and lower pin 206 which is anchored in the upper and lower support 207.

The compressive, unbalanced relation between the magnetic fields of the first rotation and oscillation assemblies induces magnetic field expansion between the two assemblies forcing the rotation assembly 200 and output shaft 208 in the direction of the force vector #1. Similarly, the compressive, unbalanced relation between the magnetic fields of the second rotation and oscillation assemblies, induces a magnetic field expansion forcing the second rotation assembly 201 and output shaft 208 in the direction of the force vector #2.

The magnetic fields of the first and second set of assemblies are equivalent. Therefore, force vectors #1 and #2 offset one another resulting in longitudinal equilibrium of the output shaft 208 without the use of thrust bearings or shaft end stops which generate friction losses. In this manner, the longitudinal forces of magnetic field expansion are contained within the output shaft 208 providing increased output torque.

In addition, increased compression of the magnetic fields between the rotation and oscillation assemblies, results in deeper penetration of the ellipsoidal shaped energy of the magnetic fields, inducing increased magnetic field expansion and greater rotational output torque.

Paradoxically, increased compression between parts without magnetic fields as arranged similarly to FIGS. 16 and 17 results in greater friction loss and decreased output torque.

FIG. 16 illustrates two linkages 215 which are each connected to one of the oscillation assemblies for transferring oscillating motion about the pivot pins 206 to the oscillation assemblies 204 and 205 via the coupling 216, cam follower 214, cylindrical cam 213 and input shaft 212.

Sequential magnetic field expansion in the present invention facilitates uniform output torque much like the effect of piston firing order of an internal combustion engine. FIG. 16 illustrates a sequential arrangement of the compressive, unbalanced relation of magnetic fields in the present invention which induces the expansion of magnetic fields in succession. The first set of rotation and oscillation assemblies 200, 202, and 204 are shown in a stage of greater compression than the second set of rotation and oscillation assemblies 201, 202 and 205 by the size of the gap between the components that provide the magnetic fields. Therefore, magnetic field expansion occurs progressively during each revolution of the output shaft 208 contributing to uniform torque.

Additionally, sequential magnetic field expansion in the present invention is achieved by orienting the first and second rotation assemblies slightly out of alignment with one another. A similar result is achieved by staggering the orientation of the first and second oscillation assemblies with respect to their respective rotation assemblies.

Uniform rotation of the output shaft 208 is enhanced by a standard flywheel mounted to the shaft. The flywheel is not shown in the illustrations.

Figure 18:
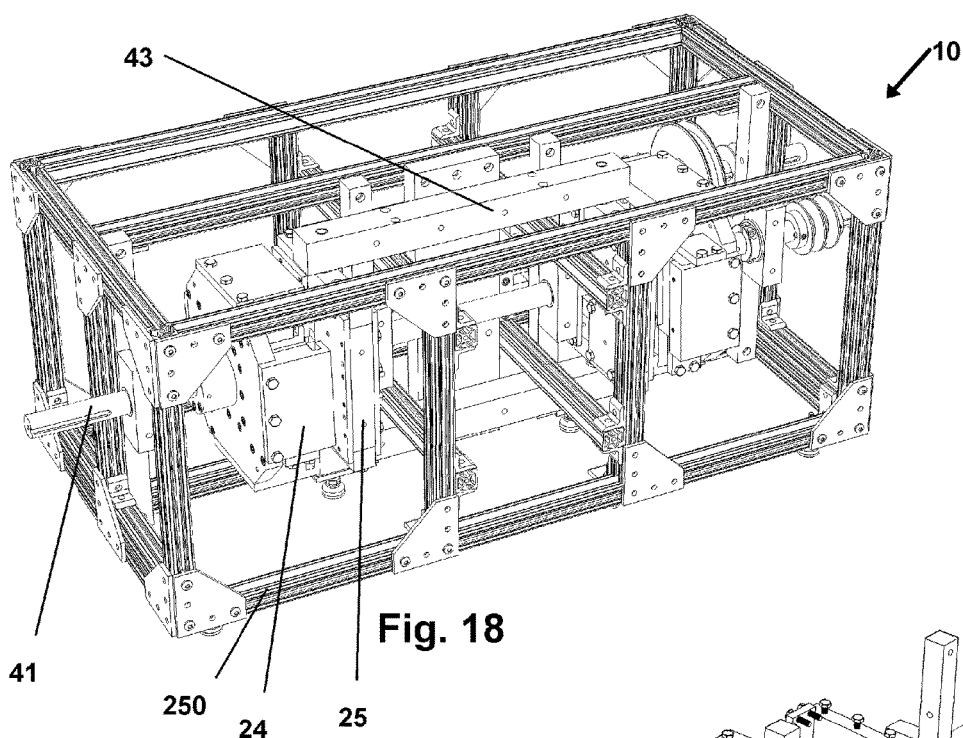
FIG. 18 shows a perspective view of a favored mode of the device operationally engaged within a housing.

FIG. 18 shows a perspective view of a favored mode of the device operationally engaged withing a housing 250. Shown are the rotational assembly 41 operatively supported with the housing 250 and having the rotational magnetic component 24 operatively positioned proximate to the oscillating magnetic component 25 which is engaged with the oscillating assembly 43.

Figure 19:
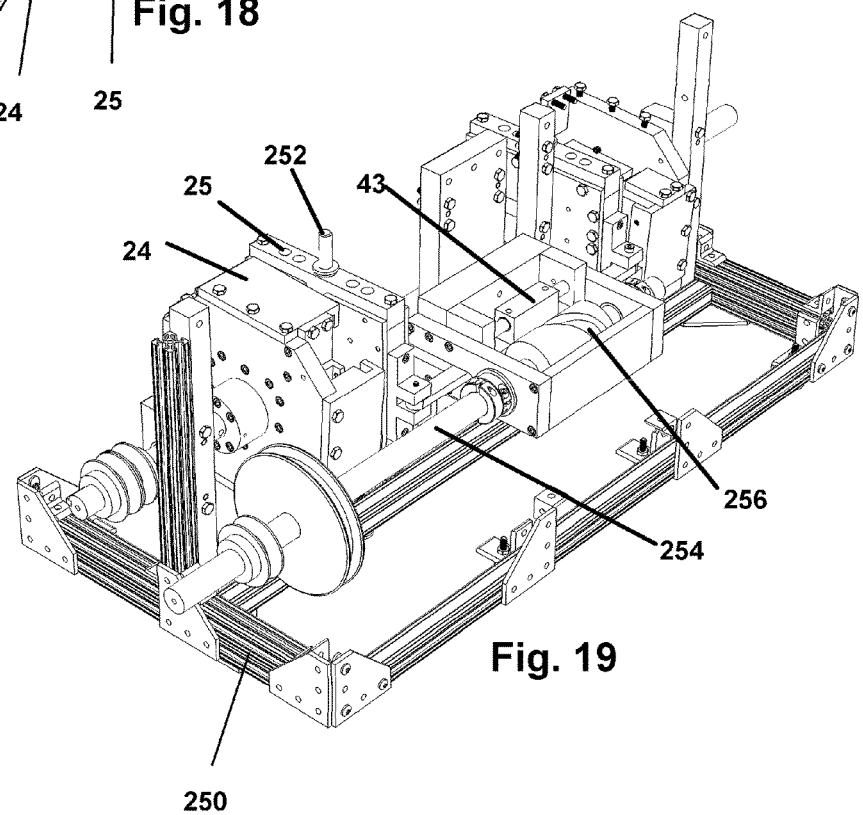
FIG. 19 shows another perspective view of the device of FIG. 18 wherein the housing and some supporting components are removed for viewing interaction between the components.

FIG. 19 shows another perspective view of the device of FIG. 18 wherein the housing 250 and some supporting components are removed for viewing interaction between the components. Depicted in this operational mode of the device 10 are the rotational magnetic component 24 proximate to the oscillating magnetic component 25 in a magnetic coupling. A pivot 252 is shown supporting the oscillating movement of the oscillating magnetic component 25. Powered movement to the oscillating assembly 43 may be delivered by rotating shaft 254 which engages cam 256 having a follower which translates the oscillating assembly 43. This mode of the device 10 has a magnetic coupling formed on both ends.

Figure 20:
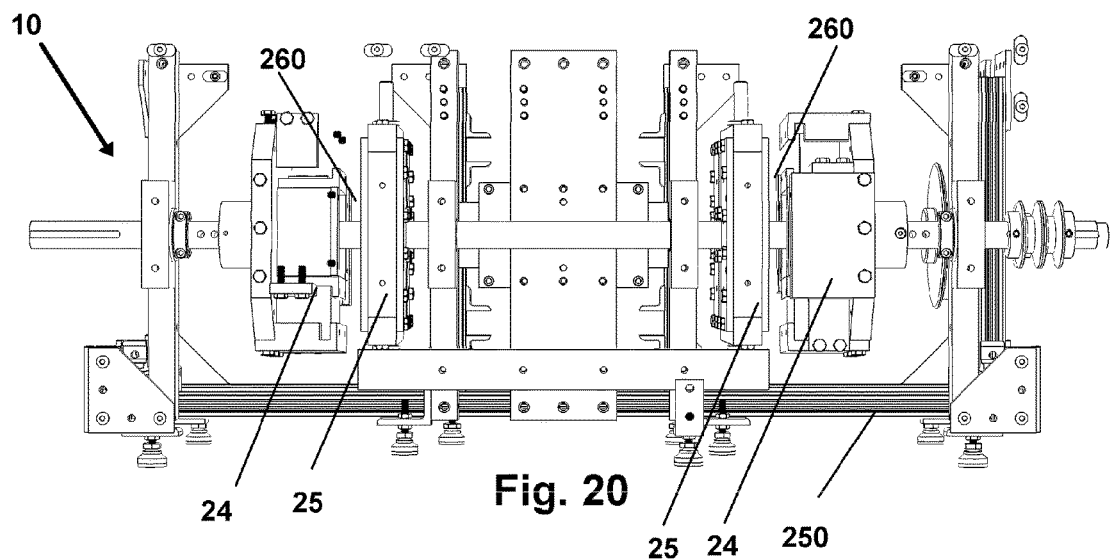
FIG. 20 shows a side view of the device of FIG. 19 with housing and support components removed to allow viewing of the operational components.

Another view of the device of FIG. 18 is shown in the side view of FIG. 20 where the magnetic components forming magnetic couplings 260 at both ends of the support housing 250 can be seen. Shown forming the couplings 260 are sufficiently proximate rotational magnetic components 24 and oscillating magnetic components 25.

Figure 21:
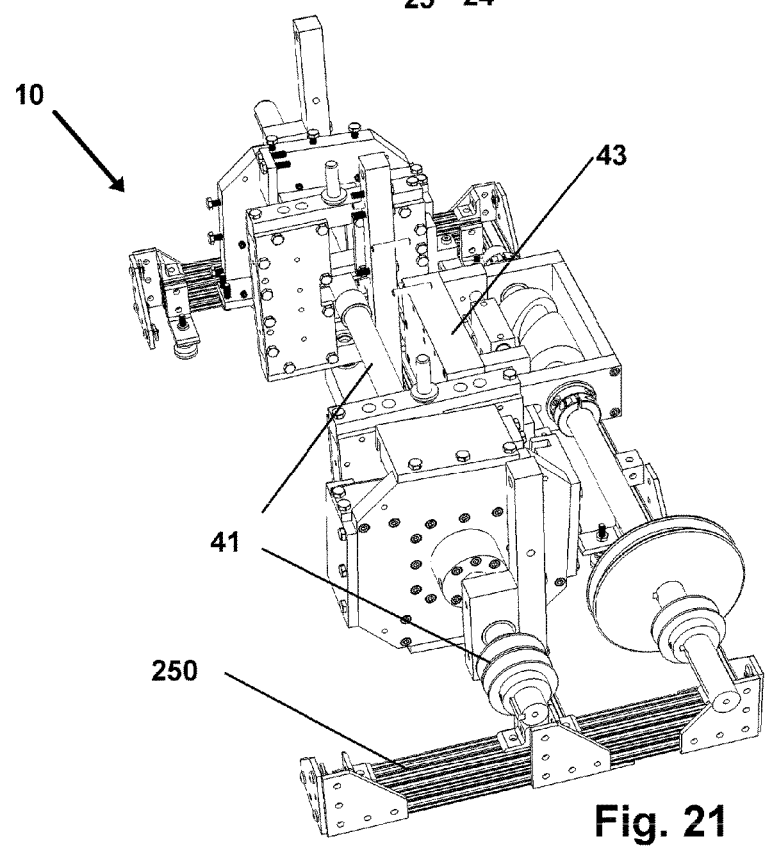
FIG. 21 depicts an end perspective view of the device of FIG. 20 having additional support structures removed to provide a better view of interacting rotational and oscillating assemblies and magnetic components.

FIG. 21 depicts an end perspective view of the device of FIG. 20 having additional support structures removed to provide a better view of the components of the interacting rotational assembly 41 and oscillating assembly 43.

Figure 22:
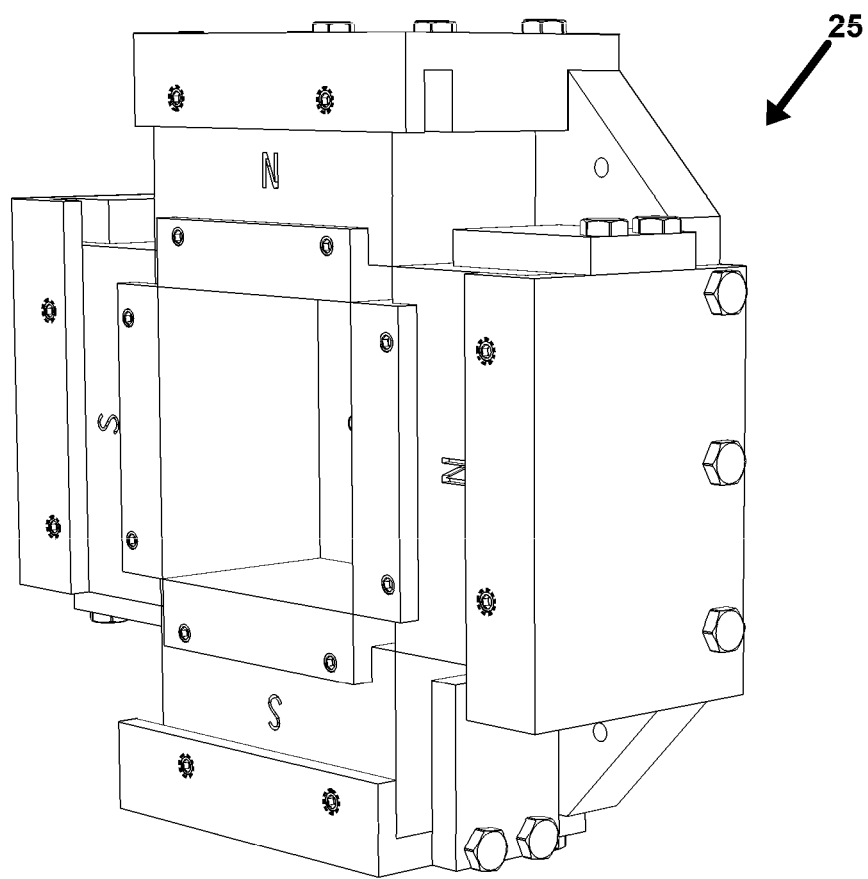
FIG. 22 shows a depiction of a rotating magnetic component described in detail in the specification

Finally, FIG. 22 shows a depiction of a rotating magnetic component 25 showing the arrangement of magnets described in detail in the above in the specification.

The foregoing is a detailed description of the disclosed polar continuity apparatus that is built, tested, and operational. Additionally, a hands-on working model of the present polar continuity apparatus is built and available for scientific demonstration. The hands-on model is oscillated by hand for the personal experience of feeling the contraction and expansion of the magnetic fields and for a visual demonstration of the resultant 360 degree rotation. Therefore, the inverse of electromagnetic induction is efficiently conveyed to science students.

As noted, any of the different configurations and components can be employed with any other configuration or component shown and described herein to form the device or employ the method herein. Additionally, while the present invention has been described herein with reference to particular embodiments thereof of the device and method, a latitude of modifications, various changes and substitutions are intended in the foregoing disclosures, and it will be appreciated that in some instance some components, or configurations, or steps in formation and/or use of the invention could be employed without a corresponding use of other components without departing from the scope of the invention as set forth in the following claims. All such changes, alternations and modifications as would occur to those skilled in the art are considered to be within the scope of this invention as broadly defined in the appended claims.

Further, the purpose of any abstract of this specification is to enable the U.S. Patent and Trademark Office, the public generally, and especially the scientists, engineers, and practitioners in the art who are not familiar with patent or legal terms or phraseology, to determine quickly from a cursory inspection the nature and essence of the technical disclosure of the application. Any such abstract is neither intended to define the invention of the application, which is measured by the claims, nor is it intended to be limiting, as to the scope of the invention in any way.

What is claimed is:

1. A magnetic drive system for changing the direction of a force communicated therethrough, comprising:
   at least one first magnetic component emitting a first magnetic field;
   at least one second magnetic component emitting a second magnetic field;
   said first magnetic component operatively engaged with an oscillating assembly;
   said second magnetic component operatively engaged with a rotating assembly;
   said first magnetic component positioned sufficiently proximate to said second magnetic component whereby said first magnetic field is in a magnetic coupling with said second magnetic field;
   said first magnetic field and said second magnetic field in said coupling, each deformed from a respective equilibrium, in a compressive or expansive relation within said magnetic coupling;
   a powered oscillation of said oscillating assembly communicating an input of said force to said first magnetic component from said oscillation assembly, said first magnetic component communicating said force through said magnetic coupling, to an output of said force by said second magnetic component in a rotational direction to said rotating assembly; and
   a powered rotation of said rotating assembly communicating an input of said force to said second magnetic component from said rotating assembly, said second magnetic component communicating said force through said magnetic coupling to said first magnetic component to impart an oscillating movement in an oscillating output of said force from said first magnetic component to said oscillating assembly.

2. The device defined by claim 1, wherein said first magnetic field and second magnetic field are each deformed from said respective equilibrium in said compressive or said expansive relation, with at least one external magnetic field communicating with said magnetic coupling.

3. The device defined by claim 1, wherein the said first magnet and said second magnet are each comprised of a magnetic component, from of a group of magnetic components, including, permanent magnets and electromagnets.

4. The device of claim 1, wherein said oscillation assembly comprises at least one shuttle communicating one of, a pivotal oscillation movement, a linear reciprocating movement, or a combination of each, to said magnetic coupling to thereby communicates an unbalanced relation of said first magnetic field and said second magnetic field, wherein said relation is alternated between respective magnetic field polar domains.

5. A magnetic drive system for changing the direction of a force communicated therethrough, comprising:
   at least one first magnetic component emitting a first magnetic field;
   at least one second magnetic component emitting a second magnetic field;
   said first magnetic component operatively engaged with an oscillating assembly;
   said second magnetic component operatively engaged with a rotating assembly;
   said first magnetic component positioned sufficiently proximate to said second magnetic component whereby said first magnetic field is in a magnetic coupling with said second magnetic field;
   a powered oscillation of said oscillating assembly communicating an input of said force to said first magnetic component from said oscillation assembly, which is in an operative engagement with an adjustable speed drive communicating said powered oscillation thereto, said first magnetic component communicating said force through said magnetic coupling, to an output of said force by said second magnetic component in a rotational direction to said rotating assembly; and
   a powered rotation of said rotating assembly communicating an input of said force to said second magnetic component from said rotating assembly, said second magnetic component communicating said force through said magnetic coupling to said first magnetic component to impart an oscillating movement in an oscillating output of said force from said first magnetic component to said oscillating assembly.

6. A magnetic drive system for changing the direction of a force communicated therethrough, comprising:
   at least one first magnetic component emitting a first magnetic field;
   at least one second magnetic component emitting a second magnetic field;
   said first magnetic component operatively engaged with an oscillating assembly;
   said second magnetic component operatively engaged with a rotating assembly;

said second magnetic component includes a plurality of said second magnetic components, said plurality formed to one of a polygon configuration of said plurality of said second magnetic components having a counter weight included in said polygon configuration of components, a circular configuration of said plurality of second magnetic components, or a combination of said polygon configuration and said circular configuration, engaged to a base at one end of a centrally located member;

said first magnetic component positioned sufficiently proximate to said second magnetic component whereby said first magnetic field is in a magnetic coupling with said second magnetic field;

a powered oscillation of said oscillating assembly communicating an input of said force to said first magnetic component from said oscillation assembly, said first magnetic component communicating said force through said magnetic coupling, to an output of said force by said second magnetic component in a rotational direction to said rotating assembly; and a powered rotation of said rotating assembly communicating an input of said force to said second magnetic component from said rotating assembly, said second magnetic component communicating said force through said magnetic coupling to said first magnetic component to impart an oscillating movement in an oscillating output of said force from said first magnetic component to said oscillating assembly.

7. A magnetic drive system for changing the direction of a force communicated therethrough, comprising:

a plurality of oscillation assemblies each having at least one first magnetic component emitting a respective first magnetic field;

a plurality of rotation assemblies each having at least one second magnetic component operatively engaged with a first end of a respective one or a plurality of rotating members, and each of said second magnetic components emitting a respective second magnetic field;

each of said one or plurality of rotating members operatively engaged with a single rotating shaft at a respective opposite end of said rotating member from said second magnetic component thereon;

an oscillation shaft engaged with all of said oscillating assemblies along an axis of said oscillation shaft;

said oscillation shaft engaged with an oscillation drive motor communicating a said input of said force in a powered oscillation thereto;

each said first magnetic component positioned sufficiently proximate to a respective said second magnetic component whereby said first magnetic field is in a magnetic coupling with said second magnetic field;

a powered oscillation of each said oscillating assembly communicating an input of said force to a respective said first magnetic component from each said oscillation assembly, each said first magnetic component communicating said force through a respective said magnetic coupling, to an output of said force by a respective said second magnetic component in a rotational direction to respective said rotating assembly;

a powered rotation of each said rotating assembly communicating an input of said force to a respective said second magnetic component from said rotating assembly, each respective said second magnetic component communicating said force through a respective said magnetic coupling to a respective said first magnetic component to impart an oscillating movement in an oscillating output of said force from said first magnetic component to said oscillating assembly;

whereby said powered oscillation of said oscillation shaft, communicates a portion of said force to each of said rotating members through a respective magnetic coupling between a respective said first magnetic component from said plurality thereof with a respective second magnetic component from said plurality thereof; and said rotating members each concurrently communicating a respective said portion of said force, in a said rotational direction, to said single rotating shaft.

8. The device defined by claim 7, further comprising:
each said first magnet component shaped to emit a said first magnetic field which is ellipsoidal in shape; and
each said second magnet component shaped to emit a said second magnetic field which is ellipsoidal in shape.

9. The device defined by claim 7 further comprising:
each of said plurality of said rotation assemblies having a plurality of at least two said second magnetic components thereon;
each one of said plurality of two said second magnetic components having a respective axis running therethrough along a longest dimension thereof; and
each respective said axis of each of said plurality of two second magnetic components running substantially normal to the other.

10. The device defined by claim 7 further comprising:
means to prevent said rotation assemblies and oscillation assemblies from moving away or toward each other during an attraction or a repelling of their respective magnetic fields in a said magnetic coupling, being provided by each of said plurality of rotation assemblies being engaged to a common rotating shaft thereby fixing said rotation assemblies in position relative to said oscillation assemblies.

11. A magnetic drive system for changing the direction of a force communicated therethrough, comprising:
an oscillation assembly;
a first magnetic component engaged with said oscillation assembly;
said first magnetic component engaged with said oscillation assembly is a first electromagnet;
an oscillation of said oscillation assembly induced by an input of a force imparted thereto, imparting an oscillation to said first magnetic component;
said oscillation of said first magnetic component communicating an oscillating magnetic field therefrom;
a rotation assembly;
a second magnetic component engaged with said rotation assembly;
said second magnetic component engaged with said rotation assembly is a second electromagnet;
said second magnetic component projecting a second magnetic field therefrom;
said first magnetic component positioned sufficiently proximate to said second magnetic component to thereby form a magnetic coupling of said oscillating magnetic field with said second magnetic field; and
said magnetic coupling outputting said force in a rotational direction to said rotation assembly;
a restraint wherein said first oscillation assembly is restrained from motion coincident with rotation of the rotation assembly whereby said rotation assembly is engageable with a component requiring said force in said rotational direction to perform work;

an electromagnetic component sequential activation controller;

said first magnetic field being in an unbalanced relation with the second magnetic field of said rotation assembly in said magnetic coupling;

said first magnetic component and said second magnetic component cooperatively connected with the electromagnetic component sequential activation controller, and wherein said electromagnetic component sequential activation controller causes an activation or a deactivation of the respective first magnetic field and the second magnetic field of each said oscillating assembly and said rotation assembly, sequentially alternating between magnetic field polar domains, whereby a resultant magnetic field expansion in said magnetic coupling induces continuous rotation of the rotation assembly.

12. A magnetic drive system for changing the direction of a force communicated therethrough, comprising:

at least one first magnetic component emitting a first magnetic field;

said first magnetic field is ellipsoidal in shape;

at least one second magnetic component emitting a second magnetic field;

said first magnetic field is ellipsoidal in shape;

said first magnetic component operatively engaged with an oscillating assembly;

said second magnetic component operatively engaged with a rotating assembly;

said first magnetic component positioned sufficiently proximate to said second magnetic component whereby said first magnetic field is in a magnetic coupling with said second magnetic field;

a powered oscillation of said oscillating assembly communicating an input of said force to said first magnetic component from said oscillation assembly, said first magnetic component communicating said force through said magnetic coupling, to an output of said force by said second magnetic component in a rotational direction to said rotating assembly; and a powered rotation of said rotating assembly communicating an input of said force to said second magnetic component from said rotating assembly, said second magnetic component communicating said force through said magnetic coupling to said first magnetic component to impart an oscillating movement in an oscillating output of said force from said first magnetic component to said oscillating assembly.

13. A magnetic drive system for changing the direction of a force communicated therethrough, comprising:

at least one first magnetic component emitting a first magnetic field;

said first magnetic component operatively engaged with an oscillating assembly;

a rotation assembly having a plurality of at least two second magnetic components thereon;

each one of said plurality of two said second magnetic components emitting a respective said second magnetic field which is ellipsoidal in shape and having a respective axis running therethrough along a longest dimension thereof;

each respective said axis of each said second magnetic filed, running substantially normal to the other;

said first magnetic component positioned sufficiently proximate to said second magnetic component whereby said first magnetic field is in a magnetic coupling with said second magnetic field;

a powered oscillation of said oscillating assembly communicating an input of said force to said first magnetic component from said oscillation assembly, said first magnetic component communicating said force through said magnetic coupling, to an output of said force by said second magnetic component in a rotational direction to said rotating assembly; and a powered rotation of said rotating assembly communicating an input of said force to said second magnetic component from said rotating assembly, said second magnetic component communicating said force through said magnetic coupling to said first magnetic component to impart an oscillating movement in an oscillating output of said force from said first magnetic component to said oscillating assembly.

* * * * *